June 14, 1960
J. M. BINMORE
2,940,594
APPARATUS FOR SEPARATING OIL FROM BALLAST
WATER IN TANKS ON BOARD SHIP
Filed Aug. 26, 1955
2 Sheets-Sheet 2
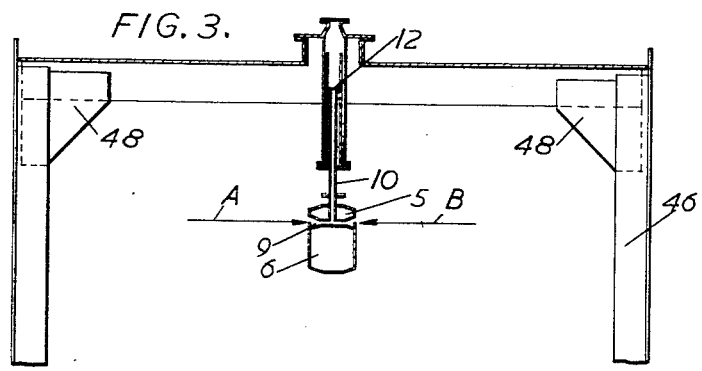
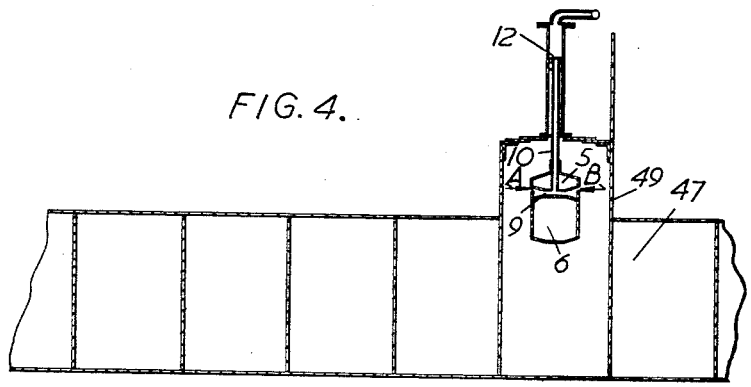
Inventor
John Martin Binmore
By Richardson, David & Nordon
Attorneys 2,940,594

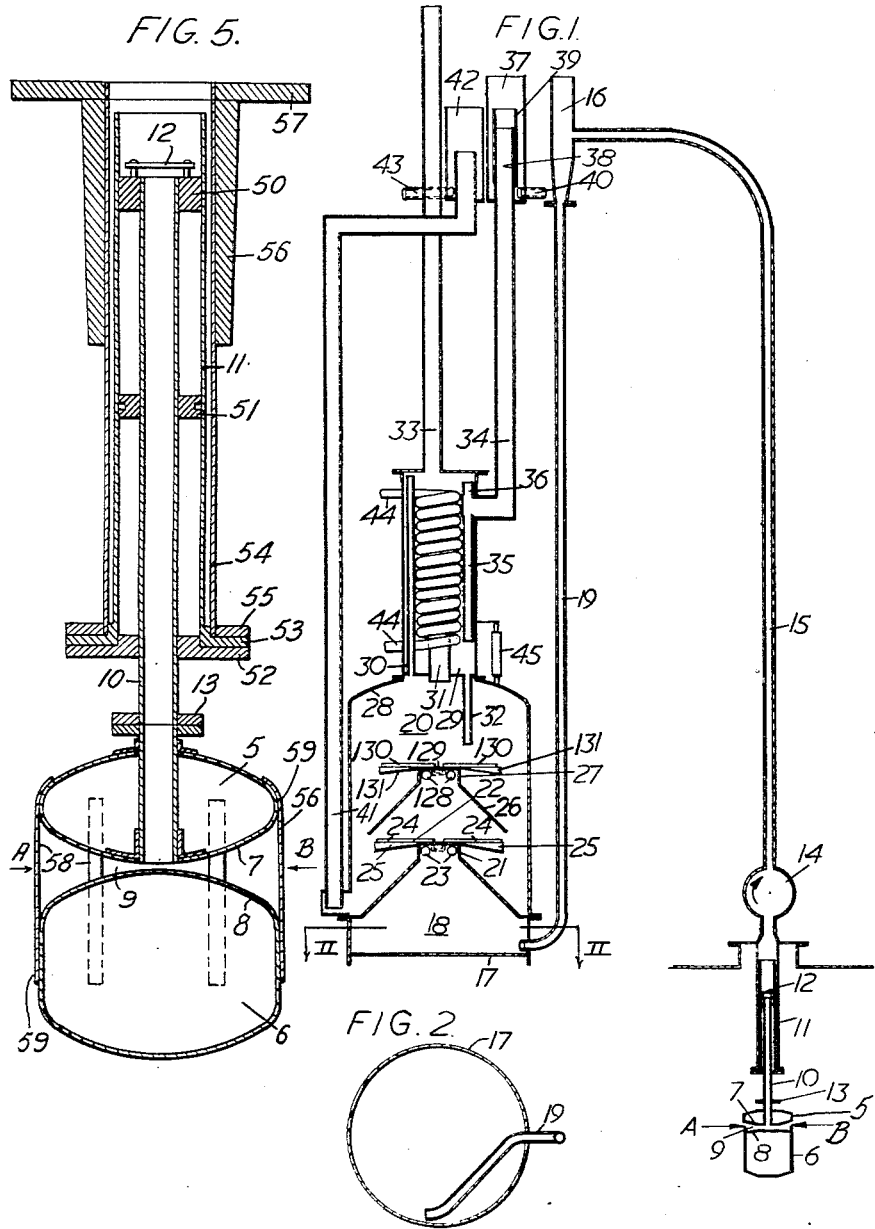

APPARATUS FOR SEPARATING OIL FROM BALLAST WATER IN TANKS ON BOARD SHIP

John Martin Binmore, Westering, Rougemont Ave., Cadewell, Torquay, England

Filed Aug. 26, 1955, Ser. No. 530,771

Claims priority, application Great Britain Aug. 26, 1954

8 Claims. (Cl. 210—180)

This invention relates to apparatus for separating oil from ballast water in tanks on board ship. The term "oil" used herein is to be construed as embracing mineral, animal and vegetable oils.

Oil may be carried in ships' bunkers as fuel or may be carried as cargo, but in either case the tanks, when emptied of oil, are filled with sea water as ballast.

At the end of each passage of a ship to the loading port, the tanks have to be made ready to receive a further cargo of oil for transportation and/or for bunkers, and in emptying the tanks, it is necessary that oil-contaminated water from the tanks is not allowed to cause pollution of the sea or harbours when pumped overboard.

It has heretofore been the practice to empty the tanks by pumping through a suction system drawing from the bottom of the tanks. With this procedure, the residue oil which remains in the tanks after discharge of cargo, or used as fuel, and which has reached the surface of the ballast water by flotation is, in part, deposited on the plates bounding the tanks as the water is pumped out. The oil remaining on the surface when the level of the floors and intercostal plates at the bottom of the ship is reached is churned by the obstruction of these parts of the ship's structure and the quantity of heavily contaminated ballast water is large.

An object of the invention is to provide means for separating oil from ballast water in tanks on board ship efficiently and economically. A further object of the invention is to salvage the oil mixed with the ballast water in the tanks and to obviate or mitigate pollution of the sea or harbours by separation of the oil from the ballast water prior to pumping of the latter overboard.

The present invention is also for removing oil and oil-contaminated water from a tank in ballast on board ship and subsequently separating the oil from the water, the operative combination of a separator, a pump, and a suction box, said separator comprising three superposed chambers adapted to enhance gravitational separation of the constituents of an oil and water mixture, a receptacle open to atmosphere and disposed at a higher level than said separator, a conduit communicating between said receptacle and the lowermost of said chambers, said pump being at a lower level than said receptacle, a conduit communicating between said receptacle and the discharge side of the pump, a vertical cylinder communicating with the suction side of the pump and descending therefrom, a vertical suction pipe fitted within said cylinder for rising and falling movement relative thereto and descending therefrom, a horizontal disc fastened to the upper end of said suction pipe and of lesser circumference than the inside wall surface of said cylinder thus momentarily to divert radially through 90° a stream of fluid flowing upwards through said suction pipe into said cylinder and produce a lifting force on said suction pipe, said suction box being mounted on the lower end of said suction pipe, said suction box comprising two buoyancy chambers secured one above the other in mutually and closely interspaced relationship to provide a through passage for flow of fluid between their mutually opposed surfaces, said suction pipe penetrating the upper of said buoyancy chambers and opening into said passage, the weight of the assembly comprising said suction box, said suction pipe and said disc being such that when said box is floating on ballast liquid in a tank the lower surface of the upper buoyancy chamber and thus the lower end of the suction pipe is immediately below the surface level of said ballast liquid.

An embodiment of the invention will now be described, by way of example, with reference to the accompanying drawings, in which:

Fig. 1 is a sectional elevation of apparatus for cleaning oil tanks in ballast on board ship in accordance with the invention;

Fig. 2 is a section on the line II—II of Fig. 1;

Fig. 3 is a sectional elevation showing a typical arrangement of the surface pumping strum of the apparatus in a deep tank;

Fig. 4 is a view similar to Fig. 3 showing a typical arrangement of the surface pumping strum of the apparatus in an oil flotation box superimposed on a double-bottom tank; and Fig. 5 is a sectional elevation to a larger scale of the surface pumping strum and the suction pipe and encasing cylinder for the latter associated therewith.

Referring now to the drawings, throughout which like reference numerals denote like parts, the apparatus comprises a suction box formed by two buoyancy chambers 5 and 6 secured together in superposed spaced relationship to provide between their mutually opposed surfaces 7 and 8 a through passage 9 for the flow of liquid. The chambers are secured together by a plurality of straps 58 spaced peripherally therearound and bonded at 59 to the external surfaces of the chambers.

A suction pipe 10 is carried by the upper buoyancy chamber 5 passing therethrough to create a suction at the surface of the liquid, the level of which is indicated in Figs. 1, 3 and 4 of the drawings by the opposed horizontal arrows A and B, and creating a surface flow of liquid between the mutually opposed surfaces 7 and 8 of the buoyancy chambers 5 and 6. The suction box 5, 6 with its attachment, is of such weight that, under pumping conditions, a flow from the surface of the liquid will be created and maintained.

The suction pipe 10 is fitted to slide freely within an encasing cylinder 11 fixed in a vertical position so that the suction box may rise and fall to maintain its level relative to the surface of the liquid. As shown in Fig. 5 the pipe 10 is fitted about its upper end with a primary piston 50 and about a median portion thereof with a secondary piston 51, the piston 50 being a tight sliding fit in the cylinder 11 and the primary function of the piston 51 being that of a guide. The lower end of the cylinder 11 is formed with an external flange 53 enabling same to be secured to a gland 52 mounted about the pipe 10. The cylinder 11 and gland 52 are fixedly positioned by a tube 54 surrounding the cylinder 11 and formed at its lower end with an external flange 55 through the medium of which the flange 53 and gland 52 are secured thereto. The tube 54 has secured thereto externally at its upper end a sleeve 56 having an external flange 57 flush with the upper end of the tube 54 and by means of which the assembly of Fig. 5 is adapted to be connected to the suction side of a pump.

The flotation of the buoyancy chambers 5 and 6 is such that it sustains the weight carried at such level as to provide submergence of the lower end of the suction pipe 10.

Under pumping action, the flow through the suction pipe is made to impinge on a disc 12 fastened to the upper end of the sliding suction pipe 10; this diverts the stream radially through 90°, thus producing both a radial stream and a lifting force.

The annular passage between the periphery of the disc 12 and the wall of the cylinder 11 is made of such dimensions as may be necessary to increase the velocity of flow therethrough, and the increase in suction force required for this creates an additional lifting force to raise the sliding assembly 5, 6, 10 and 12.

The vertical distance through which the sliding assembly can be made to rise by the suction force is made sufficient to withdraw the bottom of the suction pipe 10 through the surface of the liquid.

The withdrawal of the suction pipe 10 through the surface of the liquid allows an ingress of air to the suction flow, which effects a lowering of the density of the stream, and hence a lessening of the lifting force, and automatically checks the rise of the surface skimming suction box 5, 6. A stop bracket or guard plate 13 is provided positively to prevent excessive rise of the sliding assembly.

Under "hunting" conditions, an excess of air in the suction system breaks down the lifting force and gravitation submerges the suction orifice to restore the liquid flow and recreate the lifting force.

When operating in water with a thin film of oil on the surface, the suction stream will be composed of oil, water and air.

In passing through the suction system pump 14, the mixing produces highly aerated oil and water in the pump discharge pipe 15.

To provide for separation, the mixture of oil, water and air discharged from the pump is run into a receptacle 16, open to the atmosphere, to provide for the escape of air or gas, and placed at such height as may be necessary to provide a head sufficient for a flow to an oil and water separator 17 situated at a lower level.

The separator 17 is formed in three sections, a first lower chamber 18 into which the mixture from the pump is run by gravity from the receiving receptacle 16 through a pipe 19 and in which separation is begun by gravitation to provide a laminated flow of oil and water to a second chamber 20 disposed above the first chamber 18. The second chamber 20 provides for a continuation of the laminated flow and further gravitational separation of the oil from the water.

The air, entrained in the stream of the fluid mixture, is held more securely by the oil than by the water and thereby greater buoyancy is provided to the oil and the separation is made more rapid.

The mixture of aerated oil and water flows through the pipe 19 by gravitation from the receptacle 16 to the lower chamber 18 of the separator 17, the pipe 19 terminating in the chamber 18 close to the junction of the peripheral wall thereof with the bottom thereof being so directed, as can be seen in Fig. 2, that the inflow is consrained to follow an orbital path in the lower part of the chamber 18.

The upper wall of the chamber 18 is of truncated conical form to provide that oil separating from the fluid mixture by gravity will compact on the under surface of the cone and flow upward in the form of a laminated stream into the cylindrical topmost portion 21 of the chamber.

The upward flow is checked by a disc 22 which forms a closure for the top of the cylindrical topmost portion 21 of the chamber 18.

Ports 23 in the wall of the cylindrical topmost portion 21 of the chamber 18 allow the passage of the oil and water to the second chamber 20 and the oil, by reason of its buoyancy, to flow radially outwards on the under surface of the disc 22.

The disc 22 is provided with an upwardly-directed peripheral flange 24 to provide a catchment for water collecting thereon and radially-directed runnels 25 are embossed downwardly in the disc to allow the escape of water from the upper side of the disc 22 and convey it to a lower level so that it will not pass through the film of oil which may be flowing upwardly and passing the section of the disc 22 between the runnels 25. On the underside of the disc 22 the runnels divide the oil film into sectors to provide passages for the run of water from the top of the disc.

The second chamber 20 may be fitted with one or more compacting cones 26 truncated to terminate in a cylindrical top 27 with ports 128 and furnished with a closure disc 129 having an upwardly-directed peripheral flange 130 and radially-directed runnels 131, the object being further to compact the oil to laminated flow and to make more pronounced the separation of the oil from the water.

The top 28 of the second chamber 20 is dished upwardly to provide for a compacting of oil and air radially towards its centre.

Superimposed on the second chamber 20 is a third, deaerating and de-hydrating chamber 29. This chamber 29 communicates with the chamber 20 through a pipe 30 to convey air from the top of the chamber 20 to the top of the chamber 29 and through a pipe 31 extending to a slightly lower level into the chamber 20 and terminating in the chamber 29 at such a level that it provides an annular space at the bottom of the chamber 29 for the reception of water and a passage for oil into the chamber 29 above the level of the water. A drain pipe 32 provides means to convey the water deposit from the annular space in the chamber 29 through the oil collecting at the top of the chamber 20 and into the body of water below the oil in the latter chamber.

The top of the chamber 29 is fitted with a pipe 33 to provide for the escape of air to the atmosphere at some height higher than the remainder of the separating apparatus.

The chamber 29 is further furnished with a pipe 34 to serve as an outflow for the oil, the pipe 34 being provided with a branch extending internally within the chamber 29 to communicate by its end 35 with the annular space at the bottom of the chamber 29 and to communicate by its end 36 with the top of the chamber 29. The purpose of the branch pipes 35 and 36 is to break down such surges as may occur in the chamber 29 due to the passage of air through the oil in the pipe 33 and to provide for a steady flow upwards in the pipe 34.

The oil take-off pipe 34 is led upwardly to terminate within an oil receiver 37 and the end 38 within the receiver is furnished with a movable sleeve 39 which may be raised or lowered to increase or decrease the height at which the oil is allowed to flow.

The annular space bounded by the wall of the receiver 37 and the end portion 38 of the pipe 34 and sleeve 39 receives the oil, and it is run from there by a pipe 40 to a suitable tank or other container as may be desired.

The water which is separated off and collected in the second chamber 20 has outlet by way of a pipe 41 which is connected to said chamber 20 at its lowest level. The pipe 41 leads upwards to a water receiver 42 and terminates at some height above the bottom of the receiver 42.

Water flowing from the uppermost end of the pipe 41 passes into the receiver 42 and it is run off therefrom by a pipe 43.

The force necessary to maintain the flow through the separator with its associated parts is supplied by the head of mixed oil and water in the receptacle 16.

The flow of separated oil increases with any increase given to the head of oil beyond that datum set by the balancing head of water in the water outlet pipe 41. With a lesser quantity of oil in the system the outflow is through the pipe 41 and will be separated water. The datum referred to is the level of the surface of water on which the oil is floated and the heads required for the most efficient workings are such as will situate this level at a position within the height, bottom to top, of the pipe 30.

To assist the de-hydration and de-aeration of the separated oil, a heating element such as a steam coil 44 or other means may be provided.

To establish the correct setting of the sleeve 39 to give the correct datum of oil flotation, a sighting glass 45 to sight levels between those of the top and bottom of the pipe 30 may be provided.

Typical operative arrangements of the surface pumping strum described are shown in Figs. 3 and 4, in a deep tank 46 and in a cellular double-bottom tank 47, respectively. In the Fig. 3 arrangement the level AB is near the top of the tank and below the tank top beams 48, and in the Fig. 4 arrangement a flotation chamber 49 is provided on top of the tank for the surface pumping.

In each arrangement the surface level AB is maintained substantially constant until the oil has been separated from the ballast water, and the surface of the latter is free or substantially free of oil. The ballast water is then discharged overboard in the usual way.

I claim:

1. For removing oil and oil-contaminated water from a tank in ballast on board ship and subsequently separating the oil from the water, the operative combination of a separator, a pump and a suction box, said separator comprising three superposed chambers adapted to enhance gravitational separation of the constituents of an oil and water mixture, a receptacle open to atmosphere and disposed at a higher level than said separator, a conduit communicating between said receptacle and the lowermost of said chambers, said pump being at a lower level than said receptacle, a conduit communicating between said receptacle and the discharge side of the pump, a vertical cylinder communicating with the suction side of the pump and descending therefrom, a vertical suction pipe fitted within said cylinder for rising and falling movement relative thereto and descending therefrom, a horizontal disc fastened to the upper end of said suction pipe and of lesser circumference than the inside wall surface of said cylinder thus momentarily to divert radially through 90° a stream of fluid flowing upwards through said suction pipe into said cylinder and produce a lifting force on said suction pipe, said suction box being mounted on the lower end of said suction pipe, said suction box comprising two buoyancy chambers secured one above the other in mutually and closely interspaced relationship to provide a through passage for flow of fluid between their mutually opposed surfaces, said suction pipe penetrating the upper of said buoyancy chambers and opening into said passage, the weight of the assembly comprising said suction box, said suction pipe and said disc being such that when said box is floating on ballast liquid in a tank the lower surface of the upper buoyancy chamber and thus the lower end of the suction pipe is immediately below the surface level of said ballast liquid.

2. For pumping oil and oil-contaminated water from a tank on board ship in a condition favourable for separation of the oil from the water, apparatus comprising a pump, a vertical cylinder communicating with the suction side of the pump and descending therefrom, a vertical suction pipe fitted within said cylinder for rising and falling movement relative thereto and descending therefrom, a horizontal disc fastened to the upper end of said suction pipe and of lesser circumference than the inside wall surface of said cylinder thus momentarily to divert radially through 90° a stream of fluid flowing upwards through said suction pipe into said cylinder and produce a lifting force on said suction pipe, a suction box mounted on the lower end of said suction pipe, said suction box comprising two buoyancy chambers secured one above the other in mutually and closely interspaced relationship to provide a through passage for flow of fluid between their mutually opposed surfaces, said suction pipe penetrating the upper of said buoyancy chambers and opening into said passage, the weight of the assembly comprising said suction box, said suction pipe and said disc being such that when said box is floating on ballast liquid in a tank the lower surface of the upper buoyancy chamber and thus the lower end of the suction pipe is immediately below the surface level of said ballast liquid.

3. Apparatus as claimed in claim 1, in which at least the lower portion of the lowermost chamber is circular in plan and the discharge end of the conduit communicating between same and said receptacle approaches close to the peripheral wall of the chamber near the junction of the latter with the bottom of the chamber and directs a liquid stream issuing from said conduit on to said peripheral wall at an acute angle, whereby the mixture is constrained to follow an orbital path in the lower part of the lowermost chamber.

4. Apparatus as claimed in claim 3, in which the lowermost chamber is of truncated conical form at its upper part, so that oil separating from a mixture of oil and water by gravity compacts on to the under surface of the cone and flows upwardly in the form of a laminated stream, the truncated cone merging into a cylindrical top portion wherein the oil and water collect and which is apertured to permit the oil and water flows to continue.

5. Apparatus as claimed in claim 4, in which the intermediate chamber includes at least one compacting zone of truncated conical form on the under surface of which oil separating from a mixture of oil and water by gravity compacts and flows upwardly in the form of a laminated stream, the truncated cone merging into a cylindrical top portion wherein the oil and water collect, and which is apertured to permit the oil and water flows to continue.

6. Apparatus as claimed in claim 5 in which the wall of said cylindrical top portion is provided with a plurality of circumferentially-spaced ports to permit passage therefrom of oil and water, a horizontal disc is mounted on top of said cylindrical top portion, the oil by reason of its buoyancy flowing radially outwards on the under surface of the disc, an upwardly-directed peripheral flange is provided on said disc to provide a catchment for water collecting thereon, radially-directed runnels are embossed downwardly in said disc and deepen in the outward direction to allow the escape of water from the upper side of the disc and convey same to a lower level, so that such water does not encounter the film of oil flowing upwardly and passing between the runnels on the underside of the disc.

7. Apparatus as claimed in claim 6 in which the top of the intermediate chamber is dished upwardly whereby ascending oil and air are compacted radially inwards towards the centre thereof, an air-evacuating pipe communicates between the topmost chamber and the top of the intermediate chamber, said air-evacuating pipe serving to evacuate air to the top of the topmost chamber for exhaustion to atmosphere, a pipe for conveyance of oil extends from the topmost chamber into the intermediate chamber to a lower level than the air-evacuating pipe and projecting for a short distance only into the topmost chamber to enable water entrained with oil to fall to the bottom of the chamber before such water reaches far into the chamber, and a drain pipe for such falling water is provided in the bottom of the topmost chamber and leads down into the intermediate chamber.

8. Apparatus as claimed in claim 7, in which heating means is provided in the topmost chamber to assist dehydration and deaeration of the oil ascending in said chamber, and pipe means conveys the oil from the top of the chamber for collection.

(References on following page)

References Cited in the file of this patent

UNITED STATES PATENTS

| | | |
|---|---|---|
| 745,519 | Pravicha et al. | Dec. 1, 1903 |
| 1,494,906 | Haynes | May 20, 1924 |
| 1,698,002 | Pink | Jan. 8, 1929 |
| 1,703,041 | Imhoff | Feb. 19, 1929 |
| 1,708,021 | Lenz et al. | Apr. 9, 1929 |
| 1,710,006 | Peter | Apr. 23, 1929 |
| 1,859,246 | Rossell et al. | May 17, 1932 |
| 1,958,010 | Meurk | May 8, 1934 |
| 2,307,154 | Osuna | Jan. 5, 1943 |
| 2,330,508 | McColl | Sept. 28, 1943 |
| 2,330,589 | Juell | Sept. 28, 1943 |
| 2,585,878 | Tryon | Feb. 12, 1952 |